United States Patent
Rickhardsson et al.

(10) Patent No.: US 9,902,075 B2
(45) Date of Patent: Feb. 27, 2018

(54) VACUUM GENERATOR DEVICE

(71) Applicant: Xerex AB, Taby (SE)

(72) Inventors: Fredrik Rickhardsson, Vaxholm (SE); Jonas Nilsson, Brottby (SE)

(73) Assignee: Xerex AB, Taby (SE)

( * ) Notice: Subject to any disclaimer, the term of this patent is extended or adjusted under 35 U.S.C. 154(b) by 0 days.

(21) Appl. No.: 15/404,706

(22) Filed: Jan. 12, 2017

(65) Prior Publication Data

US 2017/0203444 A1    Jul. 20, 2017

(30) Foreign Application Priority Data

Jan. 15, 2016    (EP) ..................................... 16151428

(51) Int. Cl.
| | |
|---|---|
| *B25J 15/08* | (2006.01) |
| *B66C 1/02* | (2006.01) |
| *B25J 15/06* | (2006.01) |
| *F04F 5/20* | (2006.01) |
| *F04F 5/52* | (2006.01) |

(52) U.S. Cl.
CPC ....... *B25J 15/0658* (2013.01); *B25J 15/0625* (2013.01); *B66C 1/0268* (2013.01); *F04F 5/20* (2013.01); *F04F 5/52* (2013.01)

(58) Field of Classification Search
CPC .. B25J 15/0625; B25J 15/0633; B25J 15/065; B25J 15/0658; B25J 15/0675; B66C 1/0268; F04F 5/20; F04F 5/52
USPC ................................ 294/183, 186, 187, 64.2
See application file for complete search history.

(56) References Cited

U.S. PATENT DOCUMENTS

| | | | | |
|---|---|---|---|---|
| 3,716,307 A | * | 2/1973 | Hansen | ................. B66C 1/0218 248/362 |
| 3,933,388 A | * | 1/1976 | Conboy | ................. B66C 1/0212 254/270 |
| 4,073,602 A | * | 2/1978 | Cagle | ........................ F04F 5/20 294/64.2 |

(Continued)

FOREIGN PATENT DOCUMENTS

| | | |
|---|---|---|
| DE | 10 2010 042755 A1 | 4/2012 |
| EP | 1 020 780 A1 | 7/2000 |

(Continued)

OTHER PUBLICATIONS

Extended European Search Report for corresponding European Patent Application No. 16151428.6 dated Jul. 20, 2016.

*Primary Examiner* — Dean J Kramer

(74) *Attorney, Agent, or Firm* — Renner, Otto, Boisselle & Sklar, LLP

(57) ABSTRACT

A vacuum generator driven by compressed air flow and arranged to supply vacuum to a vacuum gripper, wherein a vacuum flow connection is associated with the vacuum generator and arranged to be brought in flow connection with the vacuum gripper in order to supply vacuum to the vacuum gripper in result of the compressed air flow, wherein the flow connection in addition comprises a second connection arranged to supply a compressed air flow to the vacuum gripper, and wherein the flow connection comprises a valve which is actuated by a spring force in a lower position and to open the connection to the vacuum gripper and arranged to close the connection in result of an air pressure from a compressed air flow in the second connection in a higher position.

5 Claims, 3 Drawing Sheets

(56) References Cited

U.S. PATENT DOCUMENTS

| | | | | |
|---|---|---|---|---|
| 5,188,411 | A | * | 2/1993 | Golden ................. B65G 47/91 |
| | | | | 137/487.5 |
| 7,140,389 | B2 | * | 11/2006 | Schnatterer .............. F04F 5/20 |
| | | | | 137/565.23 |
| 7,540,309 | B2 | * | 6/2009 | Perlman ................ B25B 11/007 |
| | | | | 141/65 |
| 8,662,861 | B2 | * | 3/2014 | Tell ...................... B25J 15/0675 |
| | | | | 294/189 |

FOREIGN PATENT DOCUMENTS

| | | | |
|---|---|---|---|
| EP | 2 263 011 | * | 9/2013 |
| JP | S49 19292 B1 | | 5/1974 |
| JP | H02 110300 U | | 9/1990 |

\* cited by examiner

VACUUM GENERATOR DEVICE

This application claims priority of European Application No. 16151428.6 filed Jan. 15, 2016 which is hereby incorporated herein by reference.

TECHNICAL FIELD

The present disclosure relates to a vacuum generator device that is driven by compressed air in order to generate a negative pressure applicable for vacuum cups or similar devices.

BACKGROUND

The present invention relates generally to material handling systems and, more particularly, to vacuum generator for vacuum cup assemblies of material handling systems that are engaged with the objects and substantially sealed thereto via operation of a vacuum source or pneumatic device connected to the vacuum devices. It is known to provide a material handling system that includes vacuum cups or the like that are adapted to be moved into engagement with an object, such as a substantially flat object or panel or the like, and to lift and move the object to a desired location. Such vacuum cups or suction cups may be moved into engagement with the object, and a vacuum source may be actuated to create a vacuum between the object and the cup such that the object is retained to the cup as it is transported to the targeted area.

It is known, in order to reduce cycle times in industrial production lines, to provide vacuum generators having arrangements for the active release of objects from vacuum grippers, which grippers rely on negative-pressure or vacuum for gripping and moving the object. A solution that has been put into practice is to allow compressed air into the vacuum gripper or into a line that supplies vacuum to the vacuum gripper, typically via a controlled valve, in order this way to interrupt the vacuum which holds the object to the vacuum gripper means. This is generally, and in particular herein this disclosure referred to as so-called "blow-off". Another known solution is to connect the vacuum gripper or the supply line with atmospheric pressure, via a controlled valve. This latter solution is not considered in this disclosure.

Both of these solutions is herein this disclosure referred to as "vent a vacuum cup", i.e. deactivate vacuum.

Even if the firstly mentioned solution typically provides a reasonable fast release, this solution may however in some applications be too rough when fragile objects are concerned. In such applications the skilled person is typically limited to use the last mentioned solution, which however not always provides the desired fast response and may therefore hamper the rate of production.

Prior art devices are known from e.g. EP-B1-2263011 where it is disclosed a vacuum generator, driven by high-pressure air, and having means arranged for active release of an object that is gripped in a vacuum-gripper.

Although presently used systems have many advantages the used devices, the time to vent the vacuum cup, is in some occasions considered too long.

The object of the present invention is to achieve an improved vacuum ejector device that eliminates, or at least mitigates, the above stated drawbacks, by being more user-friendly to handle, and having shorter deactivation times.

SUMMARY

The above-mentioned object is achieved by the present invention according to the independent claim. Preferred embodiments are set forth in the dependent claims.

According to an aspect, the present disclosure relates to a vacuum ejector device for generating at least partial vacuum to be supplied to a gripping member, e.g. a suction cup. The vacuum ejector device comprises a valve actuated by a compressed air-flow in "blow-off". When blow-off is activated, the valve closes and seal off the vacuum channel. In this way efficiency of blow-off is increased by making the air-flow not going out of the vacuum ejector device.

According to an embodiment, there is provided a vacuum generator driven by a compressed air flow and arranged to supply vacuum to a vacuum gripper means, wherein a vacuum flow connection is associated with the vacuum generator and arranged to be brought in flow connection with the vacuum gripper means in order to supply vacuum to the vacuum gripper means in result of the compressed air flow. The flow connection in addition comprises a second connection arranged to supply a compressed air flow to the vacuum gripper means. The flow connection comprises a valve, which is actuated by a spring force in a lower position and to open said connection in flow connection to the vacuum gripper means and arranged to close the connection in result of an air pressure from a compressed air flow in the second connection in a higher position.

Thus, the vacuum ejector device comprises a valve actuated by the compressed air-flow in produced when "blow-off" is activated. When blow-off is activated, the valve closes and seal off the connection, also referred to as "vacuum channel", in flow connection to the vacuum gripper means.

The invention aims to avoid the above problem and to provide a vacuum generator which is arranged for a fast release of an object that is gripped by a vacuum gripper means, since no, or essentially no, blow-off air is wasted. This eliminates or reduces the problem with part of the blow-off flow going out through the ejector and will hence increase the efficiency of the blow-off by making the blow-off air not going out through the ejector.

The invention also aims to provide a vacuum generator with immediate supply of air for an active release of an object gripped by a vacuum gripper means.

Yet another object of the invention is to provide a vacuum generator comprising a release function which can be adapted to varying demands for air in order to interrupt the vacuum in a vacuum gripper means.

Through this embodiment there is provided a dual-state valve that switches between the two positions, lower and higher, of flow connection or no flow connection to the vacuum gripper means, without requiring energy to be supplied for the control of the valve.

Preferably, the valve is formed as a flap valve, suitably made of flexible material.

SHORT DESCRIPTION OF THE DRAWINGS

The invention is explained more in detail below with reference made to the accompanying drawings, wherein an embodiment of the invention is illustrated schematically:

DETAILED DESCRIPTION OF THE INVENTION

Figure 1:
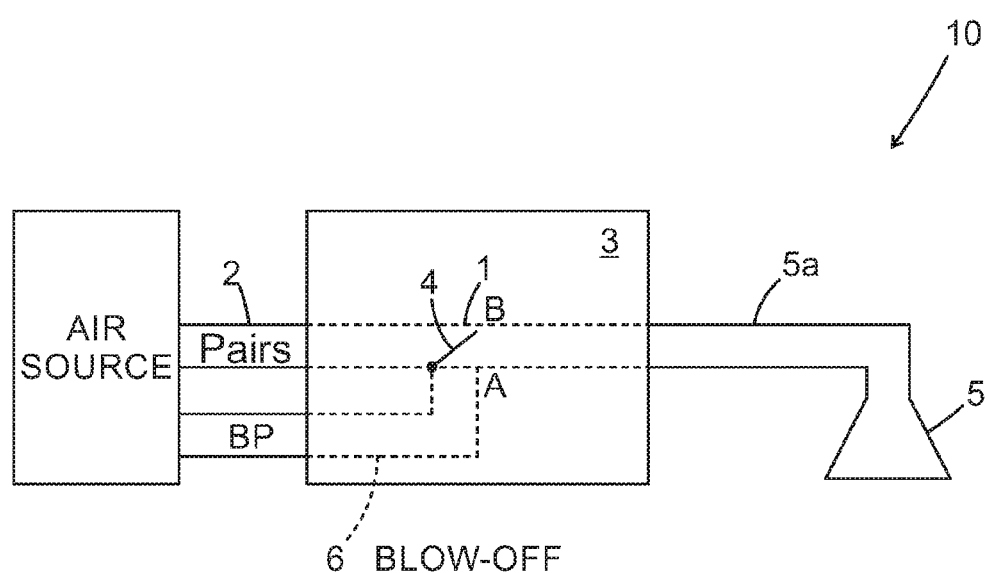
FIG. 1 is a schematic view of implementation of the invention in a vacuum system 10 comprising a vacuum generator having a valve.

For a general description of implementation of the invention in a vacuum system 10, reference is initially made to FIG. 1. In FIG. 1, the line $P_{air\ source}$ represents the direction of compressed air flow from a compressed air supply source AIR SOURCE via a line 2 to a vacuum generator 3 and a compressed air supply connection 6 to the same vacuum generator device 3 provided for so-called "blow-off". The air supply source AIR SOURCE is typically the same both for supplying compressed air flow $P_{air\ source}$ for vacuum as well as compressed air for blow-off BLOW-OFF, but via different supply connections, via line 2, or compressed air supply connection 6, respectively. The vacuum generator 3 supplies vacuum to a vacuum gripper means 5, via a suction line 5a. A valve 4 arranged in a vacuum flow connection 1 is typically switched between an opened A, and a closed position B, respectively, but may also be adjustable for a proportional control of the vacuum flow.

The vacuum generator 3, in FIG. 1 schematically illustrated, is typically realized as an ejector. The vacuum gripper means 5 may be realized as a suction cup, or as a set of suction cups that are commonly supplied from the vacuum generator 3.

It shall be noted that FIG. 1 merely depicts the general layout of a vacuum system for the purpose of illustrating the invention, and that a vacuum system in practice can comprise additional valves, sensors and flow connections in order to adapt the vacuum system to a desired functionality, as would be known to a person skilled in the art.

An embodiment of the invention will now be described with reference to FIGS. 2-4, wherein details of the embodiment that correspond to the above description of the vacuum system will be indicated by the corresponding reference numbers that were previously used in FIG. 1.

Figure 2:
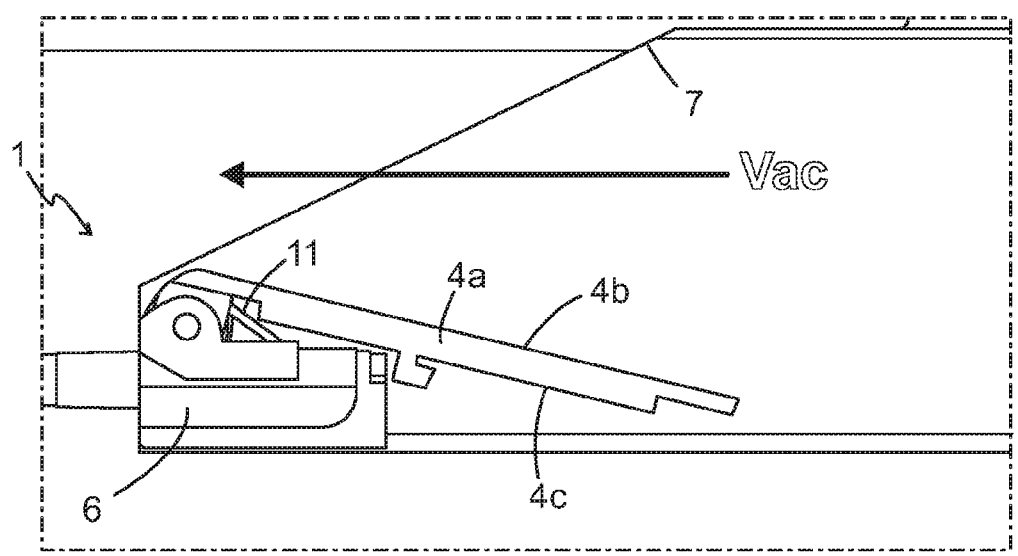
FIG. 2 is a cross sectional view through a connection associated with or comprised in a vacuum generator driven by compressed air, wherein a valve body is placed in a first valve position for vacuum flow.

Now is referred to FIG. 2, which is a cross sectional view through part of the vacuum flow connection 1 associated with or comprised in a vacuum generator 3, such as the one illustrated in and described in relation to FIG. 1, driven by compressed air $P_{air\ source}$, wherein the valve 4 is positioned in a first valve position A for vacuum flow, wherein the vacuum flow connection 1 is arranged to be brought in flow connection with the vacuum flow VaC. When the valve 4 is in this position, the vacuum flow is not disturbed or restricted by the valve body 4a.

The vacuum generator 3 is driven by the compressed air flow and arranged to supply vacuum flow VaC to the suction line 5a (see FIG. 1), in order to supply vacuum to the vacuum gripper means 5 (see FIG. 1) in result of the compressed air flow $P_{air\ source}$. The vacuum flow connection 1 in addition comprises a second air supply connection 6 arranged to supply a compressed air flow BP to the vacuum gripper means via the suction line 5a. The vacuum flow connection 1 comprises a valve 4 which is actuated by a spring force from a spring 11 in the lower position A and to open the vacuum flow connection 1 to supply vacuum flow VaC the vacuum gripper means.

Figure 3:
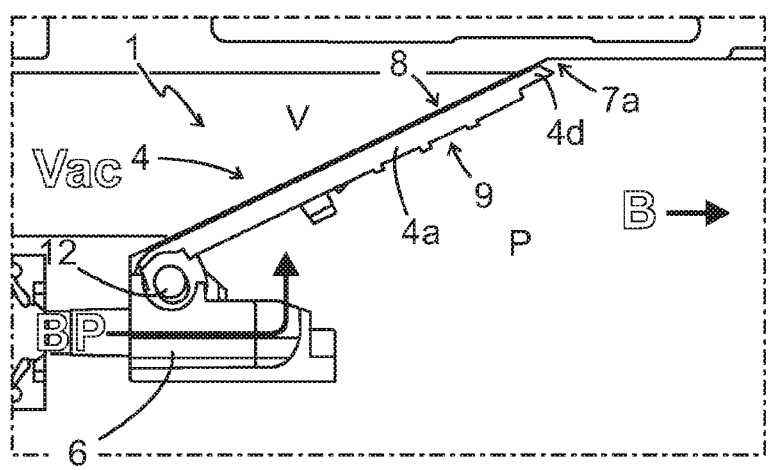
FIG. 3 is a cross sectional view corresponding to FIG. 2, wherein the valve body is located in a second valve position for blow-off.

Now is referred to FIG. 3, which illustrates when the valve 4 is arranged to close the vacuum flow connection 1 in result of the air pressure from the compressed air flow BP in the second connection 6. The valve 4 is closed in a higher position B.

As illustrated in FIG. 3, in view of a fast release of an object from the vacuum gripper means 5, the system 10 is associated with a valve 4, which actively interrupts the vacuum flow VaC to the vacuum gripper means 5 by closing the valve 4. The valve 4 is comprised in the flow connection 1 which can be connected for flow communication, via line 5a, with the vacuum gripper means 5 via the suction line 5a. The valve 4 is arranged as a dual-state valve which closes vacuum flow VaC to the vacuum gripper means 5 when compressed air BP for blow-off is supplied to the vacuum generator 3 via the connection 6.

The valve 4 is designed as a two-way valve which is actuated by the blow-off air pressure that is accumulated in the connection 6. Upon closure of the compressed air for blow off BP supplied to the vacuum generator 3 via the connection 6, the valve 4 is thus switched to open position A in result of which the flow connection 1 is brought in flow communication with the vacuum gripper means 5, via a line 5a.

With reference to FIG. 2, the valve 4 is shown in a position A wherein the compressed air BP for blow-off is considered to be interrupted. At the same moment in which the pressure side 4c of the valve body 4a is no longer under load from the flow of compressed air for blow off BP, a spring force will cause the valve body 4a to open the flow connection 1 and move to position A.

The valve 4 comprises a valve body 4a movable in a seat 7 arranged in the flow connection 1, the valve body 4a having a suction side 4b against a vacuum side V in the first position of the valve 4, as well as a pressure side 4c at least partly closing the second connection (6) in the first position A of the valve 4. This is illustrated in FIG. 2.

Figure 4:
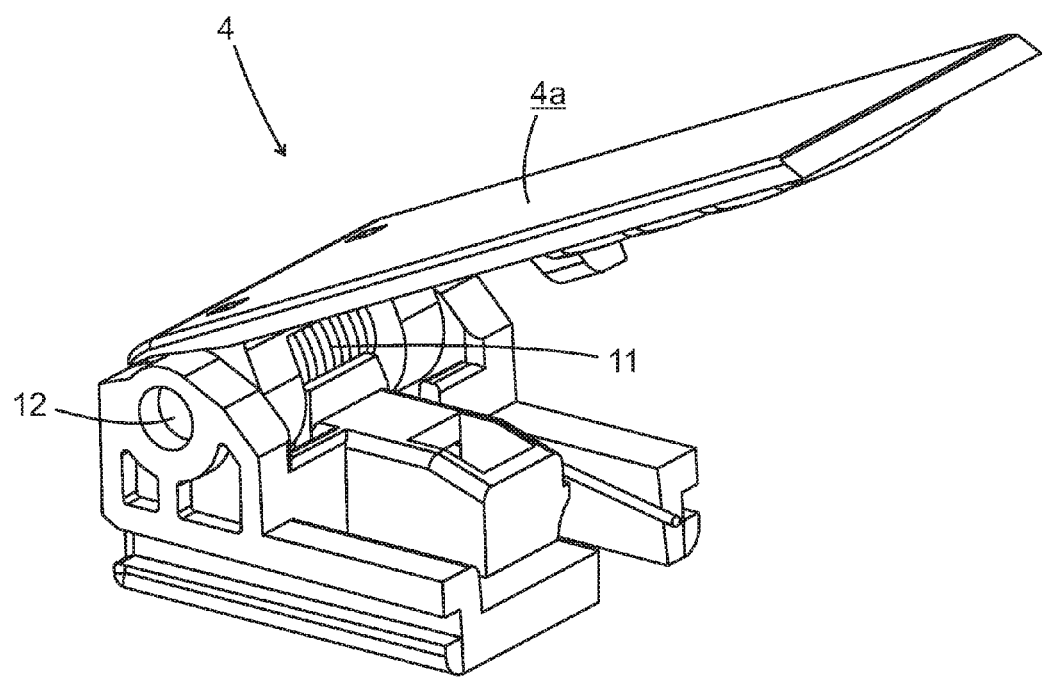
FIG. 4 is a perspective view of the valve per se.

According to an embodiment, as illustrated in more detail in FIG. 4, the valve body 4a is provided as a swingable hatch having a hinge joint 12, which is actuated by a spring force from a spring 11 in a lower position A (see FIG. 2) and to open said flow connection 1 to the vacuum gripper means and arranged to close the flow connection 1 in result of an air pressure from a compressed air flow BP in the second connection 6, in a higher position B (see FIG. 3), when over-winning the spring force 8 from the spring 11.

Typically, the valve 4 is a flap valve.

The air volume for blow-off, which is required to ensure release of an object, is depending on the collective volume of the vacuum gripper means and its associated lines and channels, in which the pressure is the same as in the vacuum gripper.

In the position shown in FIG. 3, the valve body 4a is under load 9 from the compressed air for blow off BP applied to that end of the valve body 4a which can be seen as the pressure side 4c thereof. The opposite side 4b of the valve body 4a is brought in sealing contact against the sealing surface 7a surrounding the flow connection 1 as seen in a cross-section in a flow direction thereof.

Any leakage between the valve body 4a and the seat 7 is efficiently prevented by in the region of its vacuum side 4a carries an undercut 4d running about the valve body 4a, the undercut 4d being dimensioned to seal against an inner side 7a of the seat 7 in result of the compressed air flow BP, in the second position B of the valve body 4a.

The arrangement comprising the valve 4 and associated valve elements may constitute a separate assembly (see FIG.

4) which is connectable to the vacuum generator, or may alternatively be integrated (see FIG. 1) in the structure of the vacuum generator.

The presented solution for an active release of a gripped object is this way accomplished that the release sequence can be reduced in time, also in connection with fragile objects which require a gentle release from the vacuum gripper means.

Furthermore, the presented solution is most energy efficient since no pilot air supply is needed to seal the vacuum channel and no excess compressed air is consumed during the release sequence.

The invention is defined in the accompanying claims, encompassing the above and other modifications of the invention which may be appreciated by the skilled person from the teachings provided above.

The invention claimed is:

1. A vacuum generator driven by compressed air flow and arranged to supply vacuum to a vacuum gripper, wherein a vacuum flow connection is associated with the vacuum generator and arranged to be brought in flow connection with the vacuum gripper in order to supply vacuum to the vacuum gripper in result of the compressed air flow, wherein the vacuum flow connection in addition comprises a second connection arranged to supply a compressed air flow to the vacuum gripper, and wherein the vacuum flow connection comprises a valve which is actuated by a spring force in a first position and to open said flow connection to the vacuum gripper and arranged to close the flow connection in result of an air pressure from a compressed air flow in the second connection in a second position;

wherein the valve comprises a valve body movable in a seat, the valve body having a suction side against a vacuum side in the first position of the valve, as well as a pressure side at least partly closing the second connection in the first position of the valve;

where the valve body in the region of its vacuum side carries an undercut running about the valve body, the undercut being dimensioned to seal against an inner side of the seat in result of the compressed air flow, in the second position of the valve body.

2. The compressed air driven vacuum generator according to claim 1, wherein the valve body is a swingable hatch having a hinge joint, which is actuated by a spring in a lower position and to open said flow connection to the vacuum gripper and arranged to close the flow connection in result of an air pressure from a compressed air flow in the second connection in a higher position.

3. The compressed air driven vacuum generator according to claim 1, wherein the valve is a flap valve.

4. The compressed air driven vacuum generator according to claim 1, wherein the valve is integrated in the vacuum generator.

5. The compressed air driven vacuum generator according to claim 1, wherein the valve is detachable mounted in the vacuum generator.

* * * * *